Nov. 6, 1928.

R. HOPKINSON 1,690,114

METHOD OF COLLECTING SPRAY DRIED LATICES

Filed Oct. 9, 1926

INVENTOR:-
Russell Hopkinson.
BY
Ernest Hopkinson
ATTORNEY.

Patented Nov. 6, 1928.

1,690,114

UNITED STATES PATENT OFFICE.

RUSSELL HOPKINSON, OF NEW YORK, N. Y., ASSIGNOR TO GENERAL RUBBER COMPANY, OF NEW YORK, N. Y., A CORPORATION OF NEW JERSEY.

METHOD OF COLLECTING SPRAY DRIED LATICES.

Application filed October 9, 1926. Serial No. 140,514.

This invention relates to an improved method for collecting spray dried latices. More particularly it relates to an improved method for collecting dried particles of finely divided rubber latex as they are deposited in the process of spray drying and for compacting the deposit.

Methods and apparatus have been devised for obtaining rubber from latex by finely dividing the latter and evaporating moisture from the particles while in suspension in a drying medium, the dried particles being deposited in a heap at the base of the drying chamber. The particles are more or less tacky and adhere forming a porous loosely cohering aggregate. In removing the deposit of dried latex from spray driers, the method previously followed has been to either collect the deposit directly on the floor of the drying chamber or on a movable sectional conveyor. When the deposit is allowed to collect directly upon the floor, it involves the complete shut down of the drier while removing the deposit, and owing to the heat causes considerable physical discomfort to the operators. Moreover, in either of the two methods above described, the deposit is broken up into irregular pieces and when these pieces are inserted in a baling press, it is difficult to completely and uniformly fill out the bale of compacted crude rubber formed by the press.

An object of the present invention is to provide an improved method for collecting spray dried rubber latex or similar materials. A further object is to provide a method by which uniformly compacted masses or bales of crude rubber may be formed from the dried latex deposit. A further object is to reduce the time and labor required in removing and preparing for market the deposit of dried latex from spray driers.

For a detailed disclosure of the nature and objects of the invention, reference is had to the accompanying specification and drawings in which latter:

Figure 1:
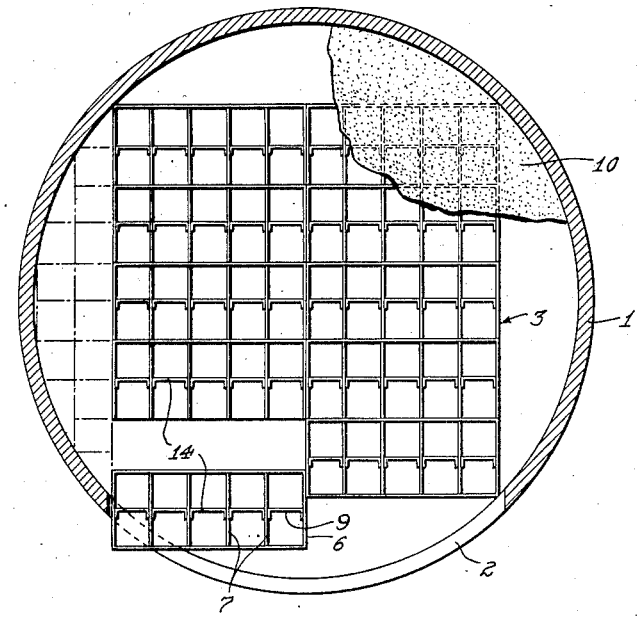
Fig. 1 is a horizontal sectional view through the latex drier with the invention applied.
Figure 2:
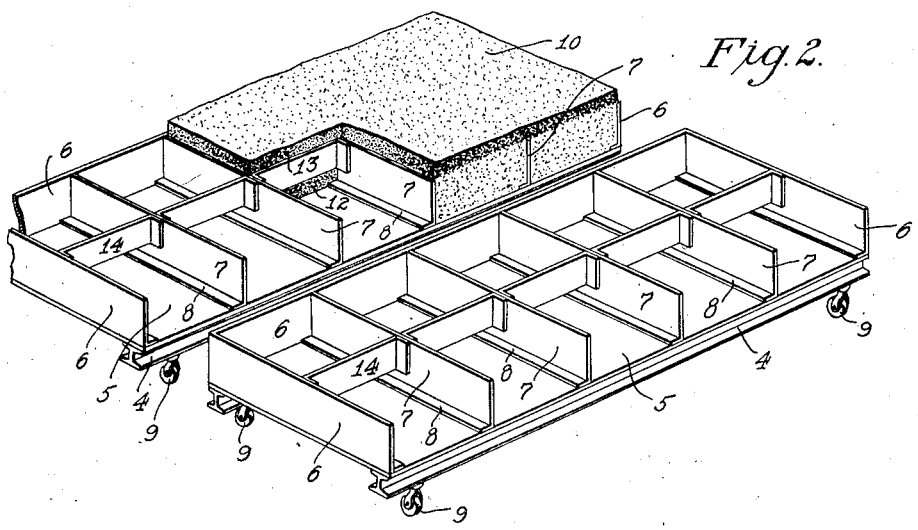
Fig. 2 is a detailed perspective view of two of the sectional collecting units shown partly separated.
Figure 3:
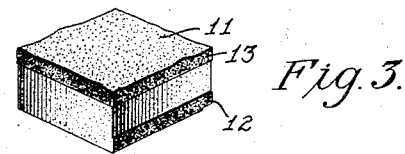
Fig. 3 is a detailed perspective view of a block of dried latex.

Referring particularly to the drawings, the numeral 1 designates the wall of a drying chamber in the present instance of general cylindrical cross section. A portion of the wall is shown broken away at the base to form an opening 2 through which sections of a tray 3 can be inserted into the drying chamber. Latex spray and a heated drying medium are supplied to the upper portion of this chamber by any suitable apparatus and in the downward course of the spray the moisture is evaporated, the dried latex falling to the bottom of the chamber in the form of small particles. The assembled sections constituting the tray form the receptacle to receive the dried particles as they fall to the bottom of the chamber.

The tray is made in sections for convenience in use, each section containing a supporting frame work 4 upon which is positioned a floor 5. Side walls 6 extend around the edge of the floor and are rigidly secured thereto. In the specific embodiment of the invention illustrated in the drawings all of the inner sections of the tray are provided with walls 6 extending around the ends and one side of each section. The two sections which are to constitute the portion of the tray positioned adjacent the opening 2 may be provided with walls which extend entirely around them. When the inner sections are positioned in abutting relation, the rear side wall of one section constitutes the front side wall for the adjacent section.

Each section is divided into a plurality of compartments by partitions 7 which extend transversely across the section and are secured to the floor thereof through a flanged portion 8. In the sections illustrated, there are four such partitions. This number can be varied as desired. Each compartment is divided by a wall 14 extending across it, the ends of the wall being flanged to form a connecting surface through which the wall is connected to the partition 7. The top of this wall extends across the compartment on a line even with the top of the receptacle, but its lower portion extends in spaced relation to the floor. By reason of this feature, a suitable implement can be inserted into the compartments from the open side and passed under the spaced wall to collect and remove any fragments of dried latex or other material contained in the entire compartment. The tray sections can be moved from one position to another by means of the casters 9. If desired, other devices such as rollers, small wheels, etc., can be substituted for the casters. There has thus been constructed a movable section made up of a plurality of compartments, the walls 7 of which completely separate the compartments and the walls 14 of which partially separate the compartments. As the dried particles fall into the compartments they form porous cohering masses therewithin of the shape of the compartments. These masses are to be removed from the tray and compacted into bales by a press. Accordingly, the size and shape of each compartment are designed to be such that the mass of dried particles deposited therein can be handled conveniently during the pressing operation and is of substantially the cross sectional shape and dimensions of the bale.

In assembling the sections to form a complete tray, the sections are inserted into the chamber with the portion of each section which is not provided with a front wall contacting with the rear wall of the next adjacent section whereby the open compartments are completely enclosed. There has now been formed a single receptacle or tray made up of numerous small compartments. The individual sections constituting the tray can be latched together if desired.

In using the tray, the sections are pushed through the entrance into the drying chamber in abutting relation where they constitute a receptacle for the dried latex which drops into the tray as tacky particles. These particles unite to form spongy cohesive masses which gradually fill up the compartments. The tray may be withdrawn from the drying chamber when the compartments are partially or wholly filled or the deposit may be allowed to accumulate above the compartment walls as shown at 10. The deposit of rubber as formed in the drying chamber normally tapers off to a relatively thin sheet at the edges of the chamber. If desired, therefore, the tray need not extend to the side wall at all points, the deposit falling directly on the floor at the uncovered points and being collected by any suitable means. There is formed in the chamber during the drying operation, a plurality of blocks 11 of dried latex. These blocks are substantially separate from each other, except at the portions 12 extending beneath the portions 14 and at the portions 13 where the deposit extends above the partition walls. Upon removing the tray from the chamber, the blocks are taken out of the compartments and are separated from each other manually, the walls or partitions 6, 7 and 14 having produced preformed lines of division. Those portions which cohere are easily broken off. The blocks are now placed in a baling press in superposed stacks or in sidewise relation and subjected to sufficient pressure to remove the occluded air whereby their volume is reduced and they are formed into compact dense blocks of crude rubber. For general use a sufficient number of the blocks of the dry deposit are compacted to form a bale of considerable weight, say 200 lbs. In the case of small rubber manufacturers, however, they frequently are not equipped with apparatus for efficiently and rapidly cutting up the large and very tough bales of crude rubber. To provide for this class of the trade single blocks of the dry material may be compressed to form slabs. These slabs may be stacked up, if desired, in number sufficient to make a package of the size of the usual bale, and covered in any suitable manner as in the case of the bale. An advantage where a single block of the deposit is compressed is that a press can be used with an opening of only five or six inches, and such a press can be cheaply made and easily operated by hand. Moreover in the case of the slabs the rubber can be more thoroughly inspected, particularly if the slabs are thin enough to be translucent.

By the method as previously outlined, means have been provided for the easy removal of spray dried latex from the chamber in which it is dried in formed blocks of convenient size for handling. In this way there has been eliminated the time and labor formerly required for breaking up a large mass of the dried deposit into small blocks. The blocks as thus produced are of regular shape which greatly facilitates arranging them in a press, and insures compacted rubber bales which are uniformly filled out at all points.

Having thus described my invention, what I claim and desire to protect by Letters Patent is:

1. The method of recovering solids from fluid materials which form a coherent dried deposit, which comprises atomizing the material in the presence of a drying medium, collecting the dried deposit as substantially separate units of predetermined area, and compacting said units.

2. The method of recovering solids from fluid materials which form a coherent dried deposit, which comprises atomizing the material in the presence of a drying medium, collecting the deposit as substantially separate units of substantially uniform area, and compacting said units.

3. The method of recovering solids from fluid materials which form a coherent dried deposit, which comprises atomizing the material in the presence of a drying medium, depositing the dried material with preformed intersecting lines of division, separating the deposit into sections along said lines, stacking the sections, and compacting the superposed sections to form blocks.

4. The method of recovering solids from fluid materials which form a coherent dried deposit, which comprises atomizing latex in the presence of a drying medium, depositing the dried latex in layer form, dividing the dried material into substantially separate adjoining sections as deposited, removing and stacking the sections, and compacting the sections to form blocks of crude rubber.

Signed at New York, county of New York, State of New York, this 6th day of October, 1926.

RUSSELL HOPKINSON.